Figure 1:
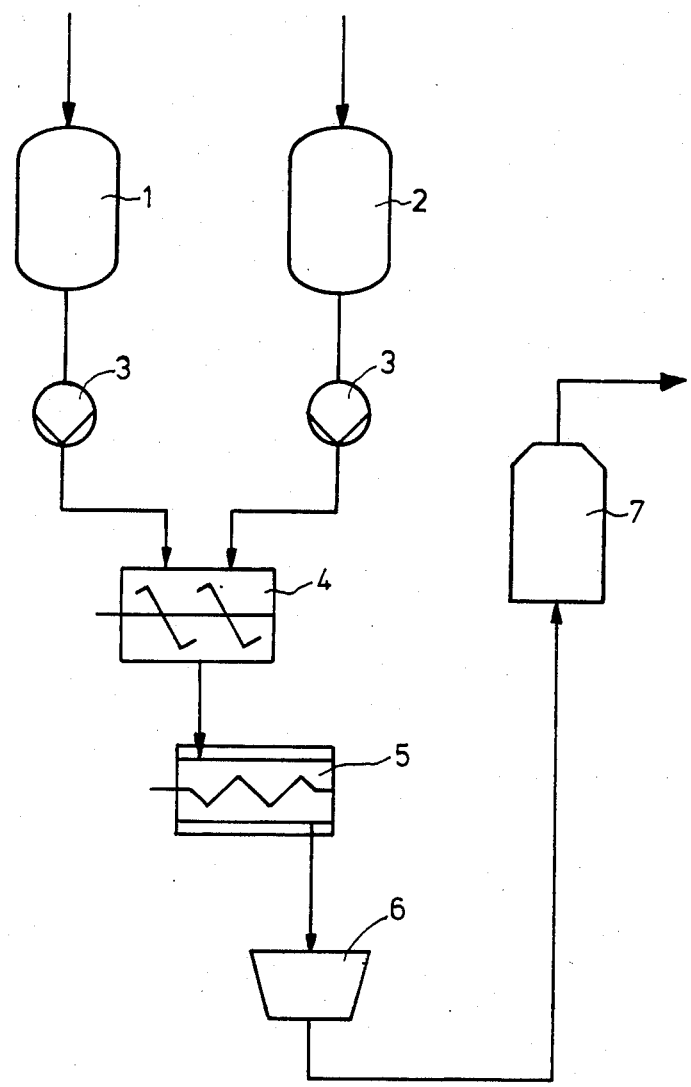

United States Patent [19]

Huhn et al.

[11] Patent Number: 4,614,780
[45] Date of Patent: Sep. 30, 1986

[54] HIGH MOLECULAR WEIGHT WATER-SWELLABLE SUBSTANCES

[75] Inventors: Helmut Huhn, Walsrode; Werner Karstens, Bomlitz, both of Fed. Rep. of Germany

[73] Assignee: Wolff Walsrode Aktiengesellschaft, Walsrode, Fed. Rep. of Germany

[21] Appl. No.: 673,298

[22] Filed: Nov. 20, 1984

[30] Foreign Application Priority Data

Dec. 3, 1983 [DE] Fed. Rep. of Germany ........ 3343852
Mar. 14, 1984 [DE] Fed. Rep. of Germany ........ 3409269

[51] Int. Cl.$^4$ .............................................. C08F 20/44
[52] U.S. Cl. .................................................. 525/329.1
[58] Field of Search ............................ 525/329.1, 279

[56] References Cited

U.S. PATENT DOCUMENTS

| | | | |
|---|---|---|---|
| 3,251,812 | 5/1966 | Hsieh | 525/329.1 |
| 3,715,341 | 2/1973 | Uelzman | 525/279 |
| 3,716,506 | 2/1973 | Simms et al. | |
| 3,806,498 | 4/1974 | Wilson et al. | 525/375 |
| 3,828,024 | 8/1974 | Breslow | 525/375 |
| 3,907,756 | 9/1975 | Marx et al. | 525/375 |
| 4,310,593 | 1/1982 | Gross | 428/290 |
| 4,337,328 | 6/1982 | Holst et al. | 525/329.1 |
| 4,357,437 | 11/1982 | Huhn et al. | 525/383 |

FOREIGN PATENT DOCUMENTS

| | | | |
|---|---|---|---|
| 0023347 | 2/1981 | European Pat. Off. | |
| 1170571 | 5/1964 | Fed. Rep. of Germany | 525/375 |
| 4712531 | 9/1968 | Japan | 525/279 |
| 848368 | 9/1960 | United Kingdom | |
| 1162032 | 8/1969 | United Kingdom | |
| 2054706 | 2/1981 | United Kingdom | |

*Primary Examiner*—Joseph L. Schofer
*Assistant Examiner*—N. Sarofim
*Attorney, Agent, or Firm*—Sprung Horn Kramer & Woods

[57] ABSTRACT

Water swellable substances based on crosslinked polyacrylonitrile hydrolysates, preferably in granulate form useful for improving water retention in sandy soils and plant substrates.

8 Claims, 1 Drawing Figure

HIGH MOLECULAR WEIGHT WATER-SWELLABLE SUBSTANCES

This invention relates to water-swellable substances based on crosslinked polyacrylonitrile hydrolysates, preferably in granulate form, which are especially useful for improving water retention in sandy soils and plant substrates.

It is already known from EP-A 0 023 347 that the water retention of sandy soils can be improved by the addition of from 1 to 20% by weight of a polyacrylamide crosslinked with N,N-methylene-bis-acrylamide. This polymer is preferably added to the soils in granulate form.

There is a need not only to provide soil improvement agents of the type in question having equally good or even better properties, but also to produce them in a simple manner.

This is possible with the inventive agents which are obtained by reacting a water-soluble polyelectrolyte based on hydrolyzed polyacrylonitrile with a crosslinking agent produced from aziridine and/or methyl aziridine and at least bifunctional esterification products of at least dihydric alcohols and acrylic and/or methacrylic acid.

Accordingly, the present invention relates to water-swellable substances of high molecular weight obtained by reacting water-soluble hydrolysis products of polyacrylonitriles containing at least 30% by weight, preferably 30 to 80% by weight acrylic acid units of which up to 100% and preferably from 60 to 95% may be present as ammonium and/or alkali and/or alkaline-earth metal salts, such as Na, K, Mg salts, in the form of an aqueous 5 to 65% by weight solution and preferably in the form of a 15 to 50% by weight solution with from 0.3 to 10% by weight, preferably with from 1.5 to 5% by weight, based on the hydrolyzed polymer, of a crosslinking agent produced by reacting aziridine and/or methyl aziridine with an esterification product of an at least dihydric alcohol with acrylic and/or methacrylic acid, the reaction of the hydrolyzed polyacrylonitrile with the crosslinking agent being carried out at temperatures in the range from 0° to 100° C., preferably at temperatures in the range from 20° to 85° C. and at pH-values kept in the range from pH 3 to 8.

The products produced in accordance with DE-OS 30 29 027 may be used with advantage as the hydrolysis products of polyacrylonitrile. In their case, hydrolysis is preferably continued to such an extent that the hydrolysis product may consist of from 30 to 80% by weight of acrylic acid units optionally present in salt form, from 20 to 70% by weight of acrylamide units and from 0 to 10% by weight of acrylonitrile units.

Suitable crosslinking agents are, in particular, reaction products of aziridine and/or methyl aziridine with an esterification product of acrylic and/or methacrylic acid with an at least dihydric alcohol such as, for example, glycol, glycerol, trimethylol propane, pentaerythritol, preferably a trihydric alcohol. The adduct of methyl aziridine and trimethylol propane triacrylate may be used with particular advantage as the crosslinking agent.

To produce the water-swellable substances, suitable polyelectrolytes in the form of a 5 to 65% by weight and preferably 15 to 50% by weight aqueous solution are crosslinking at 0° to 100° C. and at pH 3 to 8 with from 0.3 to 20% by weight and preferably with from 1.5 to 5% by weight, based on the polymer, of an adduct of an at least difunctional acrylate and (methyl)aziridine.

Since the crosslinking rate depends on temperature, this fact facilitates not only a simple and economic application of the components to desired substrates by known application techniques for liquids, but also the continuous production in the form of a free-flowing end product.

For example, the pot life of a mixture of a 20% by weight aqueous solution of a polyelectrolyte consisting of 48% by weight of polyacrylamide units and 52% by weight of polyacrylic acid units up to 90% of whose carboxyl groups are neutralized by ammonium hydroxide, and 3% by weight of the above mentioned preferred crosslinking agent is approximately 10,000 sec. at 20° C. and approximately 30 sec. at 80° C. Pot life is defined as the time required for the formation of a dimensionally stable gel after mixing of the components.

If a substrate is to be coated with the water-swellable substances produced in accordance with the invention, the aqueous polyelectrolyte solution is mixed with the crosslinking agent at temperatures below 20° C. Once the mixture of the two components has been applied, crosslinking takes place during drying of the coated substrates.

The production of a dry granulate or free-flowing powder of the water-swellable substances may be carried out continuously or in batches from the same mixture using a heatable tubular screw, a granulator and a dryer. Drying may be carried out in a pneumatic conveying dryer or a fluidized bed dryer.

The granulate is preferably produced as shown in FIG. 1. The polyelectrolyte and crosslinking component are pumped by metering pumps (3) from separate storage containers (1) and (2) via a static mixer (4) into a screw reactor (5) in which they are reacted for 309 secs. to 5 mins. at 60° to 100° C. and preferably at 80° to 90° C., the reaction product granulated in a granulator (6) and the granulate dried in known manner in a fluidized bed dryer (7).

The soil improvement agent according to the invention is preferably added in quantities of from 1 to 8 kg/m$^3$ and more preferably in quantities of from 2 to 4 kg/m$^3$, thus providing a water retention of up to 360 g/g of soil improvement agent.

EXAMPLE 1

(a) Polyelectrolyte solution: hydrolysate of a polyacrylontrile having the following analytical data:
Solid content: 30% by weight
pH-value: 6.7
Viscosity (Hoppler, 20° C.): 2000 mPa.s
Rel. viscosity $\eta_{rel}$: 1.8
Carboxyl group content, expressed as polymeric acrylic acid: 41% by weight based on the solid (b) Crosslinking agent: NeO Cryl CX 100 ®

(c) Production of water-swellable substance:

1000 g of the 30% by weight polyelectrolyte solution (a) are weighed into a 1500 cc stainless steel container and heated to 85° C.

45 g of a 20% emulsion—prepared beforehand—of the polyfunctional crosslinking agent (b) in water at 20° C. are stirred into the heated solution using a laboratory stirrer turning at 700 r.p.m.

Crosslinking takes place in 40 secs., resulting in the formation of a dimensionally stable, non-tacky gel. The gel formed is removed from the steel container, cut into blocks with a knife and granulated in a standard commercially available meat mincer. The gel particles thus obtained are dried for 1 hour at 140° C. in a recirculating air oven and size-reduced in a mortar to a grain size of 0.3 mm.

The amount of water absorbed after swelling is determined as follows:

0.2 g of the size-reduction substances is weighed into a 400 ml capacity glass beaker. After the addition of 200 g of deionized water, the substance/water mixture is left standing for 3 hours at room temperature to obtain adequate swelling. The swollen substance is then filtered through a 0.32 mm mesh polyethylene filter cloth. The weight of the swollen substance is determined and divided by the quantity of dry substance used. The value thus obtained is defined as the water absorption. The water absorption value amounted to 260 g/g of substrate.

EXAMPLES 2-4

Variation of the concentration of crosslinking agent. Starting products and reaction conditions as in Example 1.

| Polyelectrolyte solution, 30% by weight | Crosslinking emulsion 20% by weight | Water absorption of the swellable substance |
| --- | --- | --- |
| 1000 g | 30 g | 300 |
| 1000 g | 75 g | 95 |
| 1000 g | 105 g | 60 |

EXAMPLE 5

The polyelectrolyte used in Example 1 was reacted with 7% of KOH, based on total solids, and the ammonia released was distilled off at 98° C. until the pH-value had fallen to 6.8. A pH-value of 5.5 was then adjusted with phosphoric acid.

The polyelectrolyte solution and crosslinker emulsion were introduced into the continuous apparatus via a static mixer in such a way that a mixture of 97% of polyelectrolyte and 3% of crosslinker was obtained. The mixture was heated to 85° C. in the following screw reactor and fully reacted over a period of 90 secs., resulting in the formation of a gel.

The gel-like granulate was introduced into a fluidized bed dryer through a perforated disc arranged at the head end of the apparatus and dried to a residual moisture content of 3%.

The production has a water absorption value of 160 g/g of substrate.

EXAMPLE 6

The polyelectrolyte is produced as follows:

9.67 kg of KOH in the form of an 88-90% by weight solution in 87.5 kg of water are added at 20° C. to 84 kg of a 32.9% aqueous polyacrylonitrile copolymer suspension polymerized from a monomer mixture containing 95% by weight of acrylonitrile and 5% by weight of methacrylate (intrinsic viscosity $[\eta]$ of the copolymer 2.25 dl/g) in a 300-liter-capacity stirrer-equipped autoclave designed for a pressure of 30 bars and, after the autoclave has been closed, are heated with stirring under nitrogen to 185° C. and hydrolyzed at that temperature for 5 hours.

On completion of the reaction, heating of the autoclave was stopped and the reaction mixture cooled by expansion to 100° C. After further cooling to 30° C., the reaction mixture was discharged.

The clear, slightly colored product obtained has the following analytical data:

| | |
| --- | --- |
| Solids content: | 35% by weight |
| pH-value: | 7.0 |
| Viscosity (Hoppler, 20° C.): | 24,400 mPa.s |
| Rel. viscosity $\mu_{rel}$: | 2.43 |
| Carboxyl group content (expressed as polymeric acrylic acid): | 49% |

Crosslinking agent:

Trifunctional adduct of methyl aziridine and trimethylol propane triacrylate (NeO Cryl CX 100 ®, a product of Polyvinyl Chemie).

The polyelectrolyte solution and crosslinker emulsion were introduced into the continuous apparatus via a static mixer in such a way that a mixture of 98% of polyelectrolyte and 2% of crosslinking agent was formed.

The mixture was heated to 85° C. in the following screw reactor and fully reacted over a period of 90 seconds, resulting in the formation of a gel.

The gel-like granulate was introduced into a fluidized bed dryer through the perforated disc arranged at the head end of the apparatus and dried at 150° C. to a residual moisture content of 2.3%.

The product has a water absorption value of 630 g/g of substrate. By mixing this substance with a standard commercially available substrate based on bark compost (Edaphon ®), the maximum water capacity was improved as follows.

| | Max. water retention |
| --- | --- |
| Edaphon$^{(R)}$ without any addition of swellable products | 42% by vol. of $H_2O$ |
| Edaphon$^{(R)}$ + 2 g/l with addition of swellable products | 55% by vol. of $H_2O$ |
| Edaphon$^{(R)}$ + 4 g/l with addition of swellable products | 60% by vol. of $H_2O$ |

The optimal level for plant growth of 50% by volume of $H_2O$ is thus reached by adding the inventive products.

We claim:

1. A water-swellable substance of high molecular weight produced by reacting water-soluble hydrolyzed products of polyacrylonitrile polymers containing at least 30% by weight of acrylic acid units, up to 100% of which may be present as ammonium salts, alkali and/or alkaline-earth metal salts, in the form of a 5 to 65% by weight aqueous solution with from 0.3 to 10% by weight, based on the polymers, of a crosslinking agent, said agent being a reaction product of aziridine and/or methyl aziridine with an at least difunctional esterification product of an at least dihydric alcohol with acrylic and/or methacrylic acid, the reaction of the polymers with the crosslinking agent being carried out at temperatures of from 0° to 100° C. and at a pH-value in the range from 3 to 8.

2. A water-swellable substance produced according to claim 1, wherein said hydrolyzed products are in the form of a 15 to 50% by weight aqueous solution.

3. A water-swellable substance produced according to claim 1, wherein said hydrolyzed products are reacted with from 1.5 to 5% by weight based on the hydrolyzed polymer, of said cross-linking agent.

4. A water-swellable substance produced according to claim 1, wherein said temperature range is from 20° C. to 85° C.

5. A water swellable substance produced according to claim 1, wherein as crosslinking agent an adduct of aziridine and/or methyl aziridine with trimethylol propane triacrylate is used.

6. A water swellable substance as claimed in claim 1, wherein the hydrolyzed product is a polymer containing from 30 to 80% by weight of acrylic acid units, from 20 to 70% by weight of acrylic acid amide units and from 0 to 10% by weight of acrylonitrile units.

7. A water-swellable substance as claimed in claim 1, wherein said dihydric alcohol is selected from the group consisting of glycol, glycerol, trimethylol propane and pentaerythritol.

8. A water-swellable substance as claimed in claim 1, wherein the esterification product is fully esterified.

* * * * *